US005455573A

United States Patent [19]

Delatorre

[11] Patent Number: 5,455,573

[45] Date of Patent: Oct. 3, 1995

[54] INDUCTIVE COUPLER FOR WELL TOOLS

[75] Inventor: Leroy C. Delatorre, Sugar Land, Tex.

[73] Assignee: Panex Corporation, Sugar Land, Tex.

[21] Appl. No.: 358,704

[22] Filed: Dec. 19, 1994

Related U.S. Application Data

[63] Continuation of Ser. No. 231,305, Apr. 22, 1994, abandoned.

[51] Int. Cl.[6] .................................................. G01V 1/00

[52] U.S. Cl. .................................. 340/854.8; 340/855.1; 175/40; 166/250.11

[58] Field of Search ............................ 340/854.8, 854.4, 340/854.6, 855.1; 175/40; 166/250

[56] References Cited

U.S. PATENT DOCUMENTS 3,209,323 8/1965 Grossman, Jr. ...................... 340/854.8
4,901,069 2/1990 Veneruso ............................ 340/854.8
5,052,941 10/1991 Hernandez-Marti et al. .......... 439/194
5,278,550 1/1994 Rhein-Knudsen et al. .......... 340/855.1

*Primary Examiner*—J. Woodrow Eldred

[57] ABSTRACT

An inductive coupling device for coaxially arranged tubular members where the members can be telescopically arranged and the liner member has a magnetic core assembly constructed from magnetic iron with cylinder sloped ends and the outer member has an annular magnetic assembly aligned with the core assembly. The tubular members are nonmagnetic enclosures and together with a gap spacing define an effective air gap.

27 Claims, 4 Drawing Sheets

INDUCTIVE COUPLER FOR WELL TOOLS

RELATED APPLICATIONS

This is a Continuation application of Ser. No. 08/231,305 filed on Apr. 22, 1994, now abandoned. This application is related to the disclosure in U.S. Ser. 08/114,059, filed Oct. 23, 1993 and entitled "Side Pocket Mandrel Pressure Measuring System".

FIELD OF THE INVENTION

This invention relates to an inductive coupling device and more particularly, to an inductive coupling device useful in a downhole well tool in a string of well pipe for obtaining data for retrieval with the well tool.

BACKGROUND OF THE INVENTION

In the production of hydrocarbons from a well bore through a string of tubing, there are instances where the operator would like to monitor the pressure of the fluids over a period of time as a function of real time. In present systems to obtain a real time pressure measurement, a pressure gauge is attached to the exterior of the string of tubing and the gauge, the tubing and an attached electrical conductor wire are located in a well bore. Should a problem arise with the tool or for any other reason which might require removal of the tool, the well must be killed and the gauge retrieved with the string of tubing. Obviously, this is expensive and time consuming.

It is desirable to have a pressure gauge system-which can be utilized downhole and which can be retrieved for repair or replacement without killing the well and where real time measurements can be obtained.

Side pocket mandrels are commonly used devices in well bore operations, principally for gas lift operations. Side pocket mandrels are specially constructed with an elongated offset chamber to one side of a full opening bore through the mandrel. The offset chamber typically has an elongated pocket which is open at both ends and which is sized to receive a well instrument or tool. The well instrument can be installed in a number of ways in such a side pocket mandrel, including standard or oriented kick over tools, whip stocks or the like. The well instrument is typically installed and removed by a wireline operation.

Side pocket mandrels, as utilized in high temperature and corrosive wells, are constructed from 4130 or similar case hardened steel. One of the problems associated with modification of such mandrels is that any welding or the like requires heat treatment and any appurtenance attached to the mandrel will be subjected to heat treatment. This can produce adverse consequences on any such appurtenances. Another problem of modifying the side pocket mandrel is the existence of internal high pressure in the string of tubing which makes it necessary to prevent intrusion of fluids under pressure to the annulus of the well bore and access of the tubing fluids in the tubing string to the well bore annulus.

In other proposed systems, such as described in the OTC paper 5920, 1989 entitled "A Downhole Electrical Wet Connection System For Delivery and Retrieval of Monitoring Instruments by Wireline", a side pocket mandrel and pressure gauge utilize a downhole "wet connector" for coupling power to a tool and for read out of data. "Wet connectors" in a high pressure, corrosive environment ultimately corrode. In making up the connection, it is often difficult to make connections because of mud or debris in the well bore. Moreover, brine in the fluid causes electrical shorting of circuits. In short, an electrical wet connector is not reliable and this is particularly true over a period of time.

In another type of system known as a "Data Latch" system, a battery powered pressure gauge is installed in a mandrel which has a bypass. A wireline tool with an inductive coil is latched in the bore of the mandrel while permitting a fluid bypass. The inductive coil on the wireline tool couples to a magnetic coil in the mandrel for obtaining a read out of real time measurements. The system does not provide downhole power to the tool and battery failure requires killing the well and retrieving the tool with the well string.

Inductive coupling devices are difficult to construct for a downhole environment and yet are extremely desirable devices for downhole tools as a replacement for the above systems.

SUMMARY OF THE INVENTION

In the present invention a side pocket mandrel (which is typically case hardened to resist corrosion and temperature effects) is modified before heat treatment to provide an upwardly facing internal shoulder at its lower end. The upwardly facing shoulder has an opening aligned with the axis for the side pocket in the mandrel to sealingly receive and upwardly extending probe which is arranged with an inductive coupler. The lower end of the probe extends outwardly of the side pocket and is enclosed within a protective housing which is clamped to the side pocket mandrel. A conductor wire means passes through the protective housing and along one side of the housing to a surface located power source and recorder.

The well tool containing a pressure gauge has an end opening or housing socket which is sized to be received by the upwardly extending probe in the side pocket of the mandrel. The end opening is provided with an inductive coupler which cooperates with the probe to transmit power and data signals between the cable conductors and the well tool.

The inductive coupler coils are arranged in a co-axial configuration and utilize a common magnetic core. The clearance between the probe and the housing is controlled by dimensions of the respective parts so that an effective air gap is specifically defined.

In the construction of the coupler the housing for the housing socket is made from similar non-magnetic materials so that corrosion defined welds can be made. Similarly the probe member has an outer housing made from similar non-magnetic materials so that corrosion defined welds can be made.

The housing socket contains a magnetic structure which includes a wound annular coil and magnetic annular pole pieces. The pole pieces are longitudinally split and coated with electrical insulation to inhibit eddy currents.

The probe member contains a magnetic ferrite core in a conventional size which is received in a tubular member constructed from soft magnetic iron and longitudinally split. The split parts are coated with an electrical insulation to inhibit eddy currents.

By controlling the wall thickness of the probe member, the housing socket and the annular spacing between a probe member and the housing socket, the effective air gap is both defined and controlled and the inductive coupler is functional without requiring lamination to reduce eddy currents.

DESCRIPTION OF THE INVENTION

Figure 1:
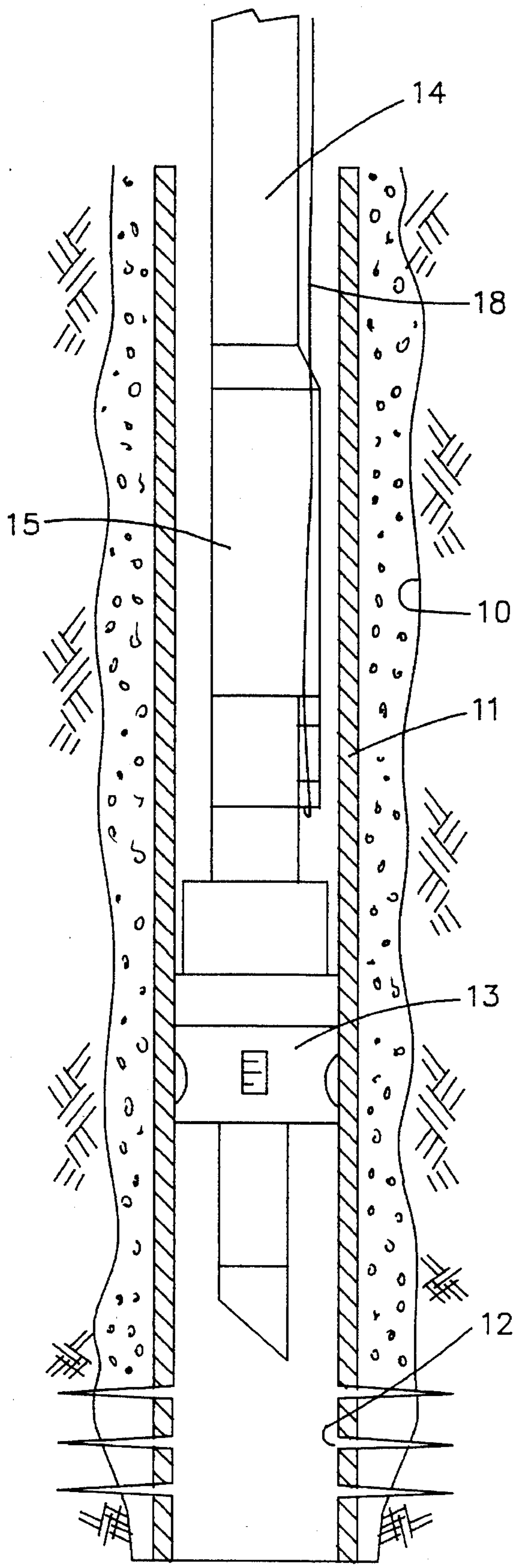
FIG. 1 is a schematic view in cross-section through a well bore containing a production packer and a side pocket mandrel pressure measuring system of the present invention.

Referring now to FIG. 1, a well bore is illustrated schematically where a well bore 10 transverses earth formations and where a liner 11 is cemented in place. Production fluids are produced through perforations 12 in the well liner and direct through a tail pipe on a production packer 13 to a string of tubing 14 for travel to the earths surface. Along the length of the string of tubing is one or more side pocket mandrels 15 which are constructed and arranged according the present invention to internally receive a retrievable pressure gauge 16 (shown in FIG. 2). As will be explained in greater detail hereafter, the pressure gauge 16, when installed in a side pocket mandrel, is arranged with an inductive coupling device positioned relative to an inductive coupler in the side pocket mandrel to be inductively powered and to passively transmit pressure data from the pressure gauge to the inductive coupler in the side pocket mandrel. The inductive coupler on the side pocket mandrel is connected to an external conductor cable 19 which extend to the surface of the earth for surface read out and recording of the data.

Figure 2:
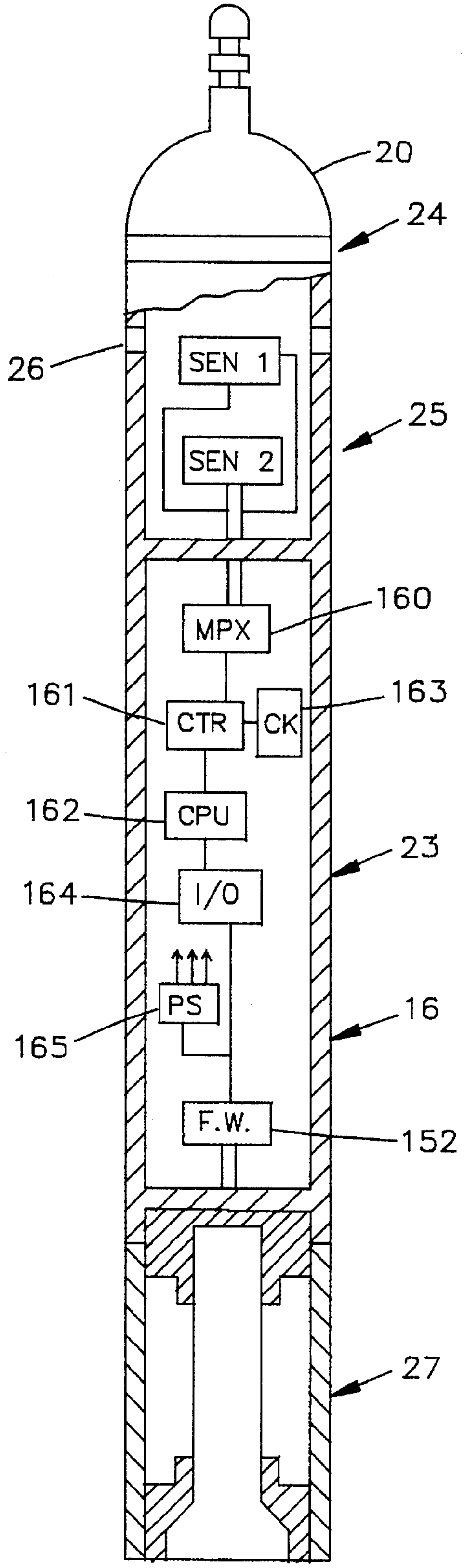
FIG. 2 is a schematic view of a pressure gauge in which the present invention is embodied.

Referring now to FIG. 2, the pressure gauge 16 is sized for inserting through a string of tubing on the end of a wire line cable. A wire line cable with a coupling device (not shown) is attached to the well tool by a conventional releasable coupler 20. A typical O.D. of the pressure gauge is 1.5 inches or less. The tool contains an electronics section 23 for electrically processing and powering the instrumentation, a temperature sensor section 24 for sensing temperature and a pressure sensor section 25 for sensing pressure or flow. An opening 26 admits pressure to the pressure sensors in the pressure sensor section 25. At the lower end of the tool is an inductive coupler section 27 which will be described in more detail hereafter.

Figure 3:
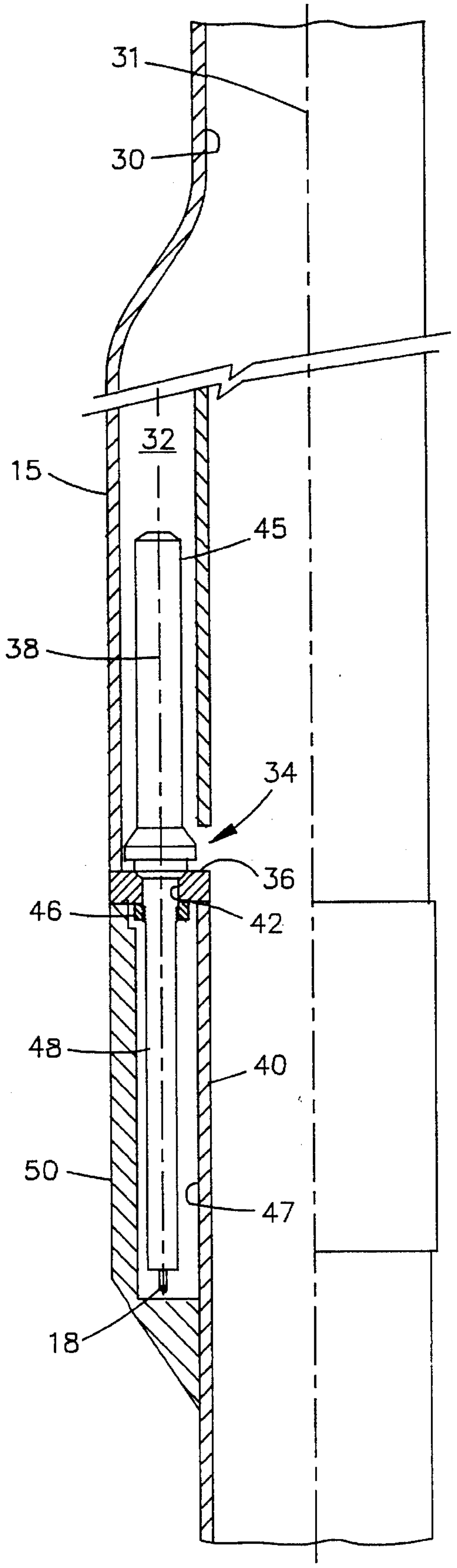
FIG. 3 is a schematic view in enlarged longitudinal cross-section through the side pocket mandrel and housing for an inductive couplet probe.

As shown in somewhat greater detail in FIG. 3, a side pocket mandrel 15 according to the present invention has upper and lower drill collar threads (not shown) for coupling the mandrel in a string of pipe. A full opening bore 30 extends through the mandrel along a bore axis 31. Along the length of the mandrel 15 is an elongated side pocket housing portion 32 which is offset axially from the bore axis 31 and has an elongated pocket which is cylindrical in cross-section and is sized to receive the cylindrically configured pressure gauge 16. The elongated pocket is arranged to one side of the full opening bore so as not to interfere with passage or flow through the full opening bore. The side pocket housing portion 32 is open at the bottom at 34 to provide a liquid or gas flow passage. Below the opening 34 is a transverse ledge or shoulder 36 which has an upwardly facing end surface which is arranged normal to the axis 38 of the side pocket and defines the bottom end of the side pocket housing portion 32. The end surface closes the lower end of the side pocket housing and connects to the curved side wall 40 of the tubular end of the side pocket mandrel. The side pocket mandrel and ledge are constructed of 4130 or similar hardened steel and are heat treated to resist corrosion and temperature effects downhole while in service.

In the horizontal ledge 36 is a access bore 42 which has an internal, upwardly facing, frusto-conical or tapered surface to provide a metal sealing surface for an inductor probe member 45. The inductor probe member 45 has a cylindrically shaped upper section extending upwardly from the ledge 36 and is centered on the axis 38 of the housing portion 32. The probe member 45 has an elongated center section with a downwardly facing metal tapered surface which engages the tapered surface of the ledge 36. A nut member 46 is utilized to attach the probe member 45 to the ledge 34 with the tapered surfaces in sealing contact with one another. Below the ledge 36 and external to the outer surface 47 of the side pocket mandrel, the probe member 45 has a high pressure electrical coupling member 48 which connects to an electrical circuit means (to be explained later) in the inductive probe member 45. The electrical coupling member 48 provides a high pressure isolation housing for preventing high pressure liquids in the side pocket mandrel from access to the exterior of the mandrel should the probe member fail. The electrical coupling member 48 is attachable to an exterior cable conductor 18 which is located on the exterior of the string of tubing and extends to the earth's surface. The electrical coupling member 48 is encased within a housing member 50 which is strapped to the exterior of the mandrel and protects the electrical coupling member 48 from damage while going in the well bore. With the forgoing construction, after the side pocket mandrel is heat treated, the probe member can be installed without requiring any welding so that the integrity of the heat treatment is maintained and the probe is not subjected to any excess temperatures.

Figure 4:
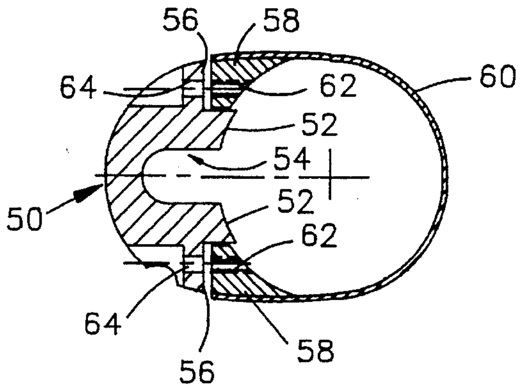
FIG. 4 is a view in cross-section through the housing for the electrical connection of an inductive coupler probe.
Figure 5:
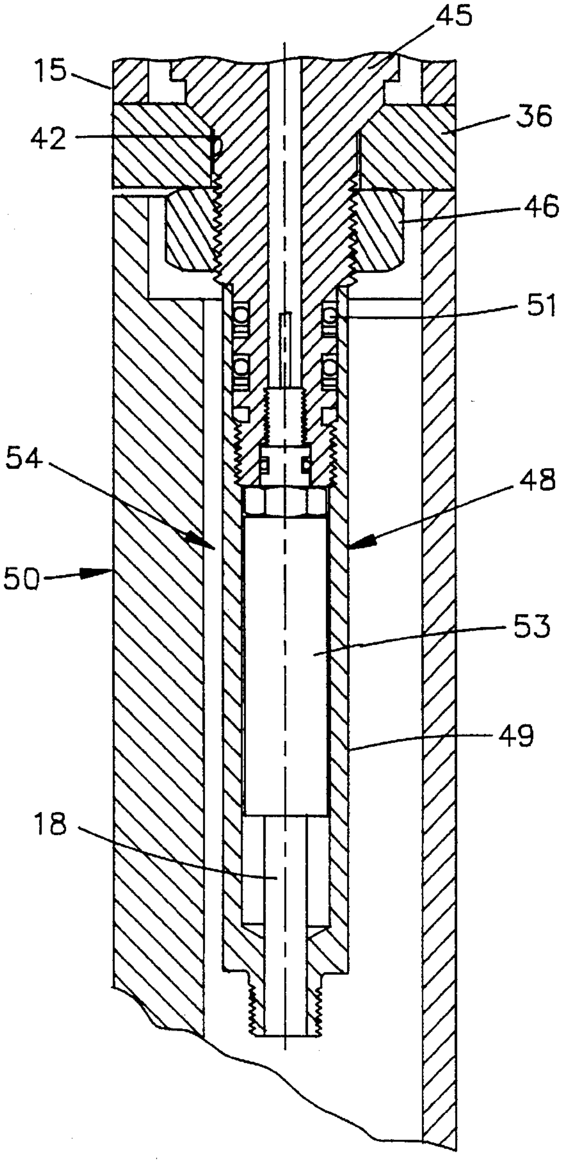
FIG. 5 is a view in partial longitudinal cross-section through a pressure coupling for an electrical connector for the probe.

The housing member 50, as shown in FIG. 4 and FIG. 5 is an elongated metal member, somewhat like a segment of a circle in cross-section, with spaced apart and curved bearing surfaces 52 for engaging the outer cylindrical surface of the mandrel. Between the spaced apart bearing surfaces 52 is an elongated, lengthwise extending channel or trough 54 (See FIG. 4) which is sized to contain the electrical coupler member 48. Adjacent to the bearing surfaces 52 are longitudinally extending side edge surfaces 56 which face lengthwise extending attachment blocks 58. The attachment blocks 58 are fixed or attached to a metal band member 60 which curves around the outer cylindrical surface of the mandrel. In the attachment blocks 58 are a number of spaced apart threaded openings 62 which align with openings 64 on the edge surfaces 56. Bolts (not shown) are utilized to pass through the openings in the edge surfaces and be threaded into the attachment blocks 58 to secure the housing member 50 the mandrel. The housing member 50 enclosed the electrical coupler member 48.

The electrical coupler member 48 includes a tubular metal housing 49 which threadedly couples to a threaded end of the probe member 45. O-ring seals 51 provide a pressure tight seal. A conventional cable connector 53 connects to a cable 18 and is sealingly received in a bore of the probe member 45. The assembly provides a pressure tight arrangement to prevent fluid from having access to the cable connections.

Construction of a probe and housing socket for an inductive coupling requires the overcoming of several obstacles. For example, welded joints with metals having dissimilar magnetic characteristics do not have a predictable definition for corrosive conditions and thus can corrode unpredictably in corrosive environments; magnetic stainless steels, when utilized, are subject to high magnetic losses; high frequency currents can generate adverse eddy currents to reduce the flux density; and shaping of ferrite pole pieces requires diamond cutting of brittle fragile ferrite. The air gap in an inductive coupling is a major problem as are the eddy currents. Eddy current losses are proportional to the squares of frequency, thus as frequency increases, the criticality of eddy currents increases.

In the present invention, there is a controlled effective air gap between the probe and the housing socket and the construction is arranged to minimize magnetic losses due to eddy currents.

Figure 6:
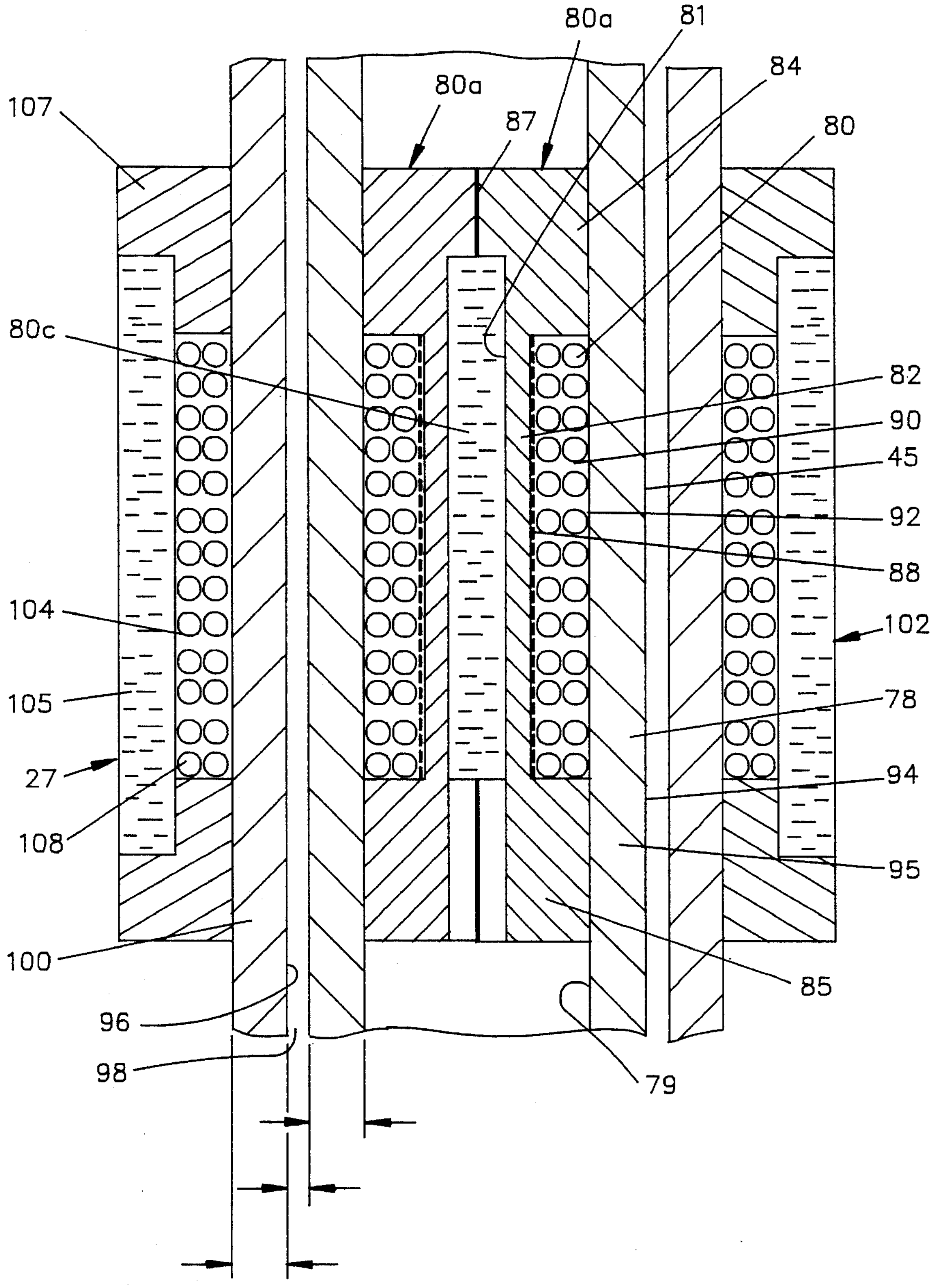
FIG. 6 is a view in partial longitudinal cross-section to illustrate the relationship of an inductive coupler probe and an inductive coupler.

In FIG. 6, a relationship of a probe and the housing socket is illustrated. The probe 45 (which is received inside of the housing socket) has a tubular section with an outer thin wall 78 (For example, 0.040 inches).constructed from non-magnetic material such as Inconel 718. The outer diameter of the probe can be 0.550 inches in diameter, for example. In the bore 79 of the probe 45 is magnetic core assembly 80. The core assembly 80 includes longitudinally split halves **80*a*, 80*b* of a tubular member which forms a spool like core piece when assembled. The core piece halves are constructed from a soft magnetic iron material and are coated with an electrical insulation such as a polydyne coating. The bore 81 of the core piece is sized to receive a standard manufactured size of ferrite rod 80*c* (For example, 0.250 inch diameter). The core assembly 80, when assembled, has a central tubular section 82 and enlarged cylinder shaped ends 84, 85 where the bore 81 is in the tubular section 82. The wall thickness of section 82 can be 0.020 inches. With this construction it can be seen that the cylinder shaped ends 84, 85 are the focus for a flux field generated by a wire coil 90. The flux field will radiate outwardly from the ends 84, 85. The split insulated construction of the core piece halves, i.e., the facing longitudinal surfaces 86 of each half of a core piece which are coated with an electrical insulator such as a high temperative polydyne coating, prevent the tubular member from acting as a shorted turn which would cause power losses. The coating is thin, i.e., about 1.0 mil to minimize disturbance of the flux field. This construction with a thin walled tubular section 82 provides a structural support for the wire coil 90 and protects the ferric core rod 80*c*** from injury.

The facing half pieces **80*a*, 80*b* are fixed to one another with an insulating tape wrap 88. Over the tape wrap 88 is the wire coil 90** forming an inductor.

The outer surface 94 of the outer wall 95 of the probe 45 is sized to be spaced from the inner wall 96 (bore) of the housing socket by a predefined or predetermined air gap spacing 98. The housing socket 27 has an inner tubular wall 100 constructed from a non-magnetic material such as Inconel 718 and may, for example, be 0.040 inches thick. Located about the inner wall 100 is an annular housing assembly 102 constructed of magnetic material and having an internal recess 104 so that spaced apart annular magnetic pole pieces 106, 107 are defined and are located at the ends of the housing assembly 102. A inductive wire coil 108 is wound on the wall 100 and the magnetic circuit is completed between the pole pieces by a magnetic tape wrap 105.

The thickness of the walls 95, 100 can be 0.040 inches each and the gap spacing can be 0.010 inches. The walls and the gap define the effective air gap (since the metal walls are non-magnetic) between the aligned pole pieces in the probe and in the housing. It will appreciated that the most that this effective air gap will vary is ±0.010 inches or 10/90 percent which is an acceptable compromise.

Figure 7:
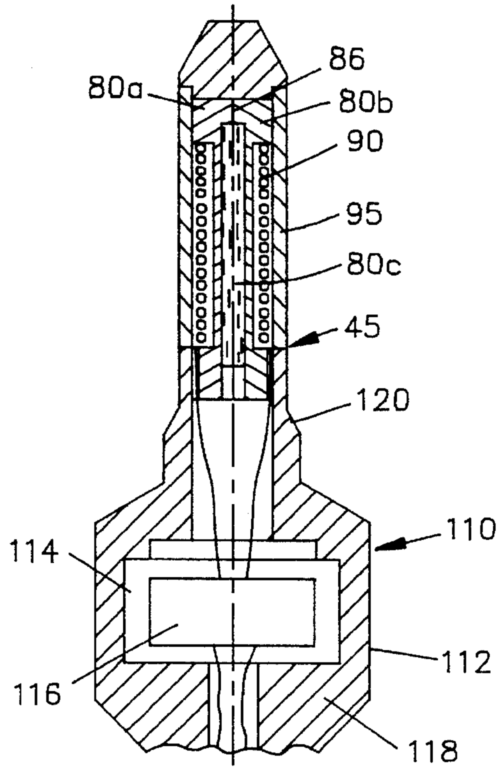
FIG. 7 is a view in partial cross-section through an inductive coupler probe.

As shown in more detail in FIG. 7, the probe member 45 has an outer tubular housing 110 constructed from a suitable non-magnetic material such as Inconel 718. The probe member 45 has portions along its length with different diameters. In the largest diameter portion 112 is an internal cavity 114 for electronic circuit means 116. The open end of the end portion 112 is received by an base member 118 of a similar material (Inconel 718, for example) and is welded to provide a pressure tight coupling. Being like materials, the weld joint has definable corrosion characteristics. Intermediate of the length of the probe member 45 is a tapered shoulder 120 and the wall 95 of the probe member. The open end of the wall 95 receives a tapered nose piece 112 which is welded to provide a pressure tight coupling. The nose piece 122 is a like material to the housing 110 (Inconel 718, for example). Disposed within the wall 95 is the core assembly which is tubular and defined by the two identical half parts **80*a*, 80*b* which are separated from one another along the facing surfaces by electrical insulation material 86 as described before. The half parts are fixed relative to one another by magnetic tape wrap and the recess between cylindrically shaped end parts contains a wound wire coil 90 which connects to the electrical circuit 116. Leakage reactance can be minimized by making the wall 82 and ends 83, 84** as long as practical in a length wise direction. For example, the ends can be 0.750 inches in length and spaced a distance of 1.0 inches apart. These parameters defined by the material, the wall thickness and the length required to meet selected physical characteristics.

Figure 8:
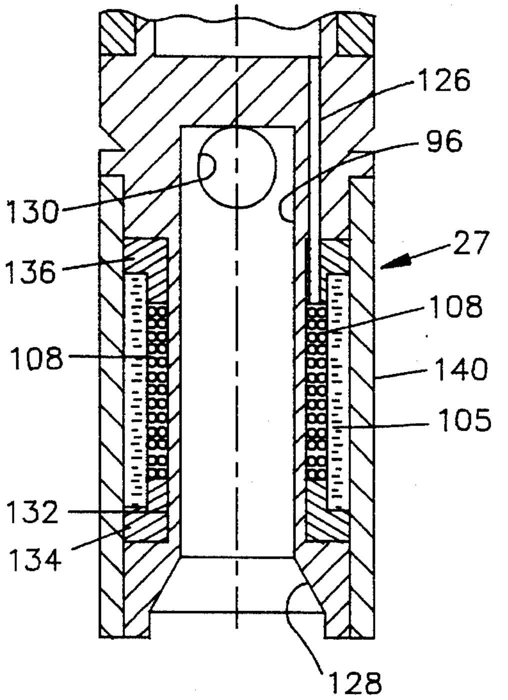
FIG. 8 is a view in partial cross-section through an inductive coupler socket.

The socket housing as shown in FIG. 8, includes a tubular housing member 126 which has an internal blind bore 96 forming a socket receptacle for the probe member. The bore can have an I.D. of 0.570 inches while the O.D. of the housing is 1.28 inches. The open end of the bore 96 has a tapered opening 128 for providing a tapered surface with respect to the tapered surface 120 on the probe member. At the closed end of the bore 96 is a bypass 130 opening for fluid bypass. In the outer surface of the housing member 126 is an annular recess 132. Disposed in the annular recess 132 are spaced apart annular pole pieces 134, 136. The annular pole pieces 134, 136 are longitudinally split in half and coated with electrical insulation so that the facing surfaces are separated by an electrical insulator coating. A wire coil 108 is wound about the recess intermediate of the pole pieces 134, 136 and magnetic tape 105 is wrapped about the coil and pole pieces to contain the assembly and to complete the magnetic circuit. The coil 108 is connected to electrical circuitry via ports in the pole piece and housing. A tubular outer housing sleeve 140 of non-magnetic material is disposed over the assembly and welded to the housing 126. The housing sleeve 140 and the housing 126 are made of similar non-magnetic materials such as Inconel 718 so that the weld has a definable corrosion characteristic.

In respect to the forgoing construction it will be noted that the magnetic tape should be as thin as possible to minimize eddy currents, for example, a 2 mil thickness with an insulated coating is satisfactory at 15,000 HZ. If the probe is centered in the socket then there is a uniform air gap and uniform flux so that eddy currents in the ends 84 and 85 and in the pole pieces 106 and 107 will cancel out. This cancellation occurs because the flux lines in a radial direction are uniformly distributed, symmetrical and of the same magnitude throughout the end pieces. Thus there is no return path for the eddy current. Stated another way, a single line of flux will generate a circular eddy current around it. In the case of adjacent lines of flux of the same magnitude, the eddy currents cancel so that the effective eddy current must flow about both lines of flux. In a radial distribution of flux where the lines of flux have equal strength and distribution, then there is no path for an effective eddy current since all of the eddy currents between adjacent flux lines cancel. The ferrite core because of its construction inhibits eddy currents. Also, the electrical insulation acts in the support half pieces hinder or stop eddy currents. Further if the socket and probe are offset relative to one another, the worse case is a 1/9 error which can be accepted. What should be appreciated is that the inductive coupling of the present invention is a transformer without lamination in the construction where soft iron can be used with higher frequencies and where the construction is economically practical. The ferrite core is off the shelf; soft magnetic iron is readily machinable and obtainable; and welding of common materials gives a definable corrosion characteristic. Thus, corrosion resistant materials with corrosion definable welds can be used successfully.

Figure 9:
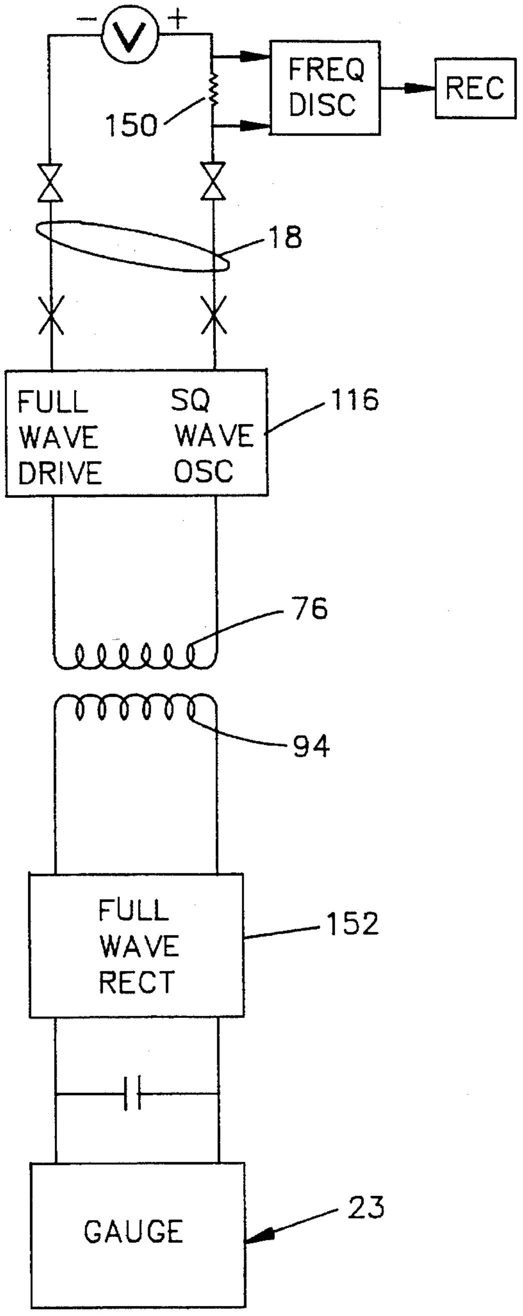
FIG. 9 is an electrical schematic of the electrical system for obtaining real time surface pressure measurements with use of an inductive coupling system.

Referring now to FIG. 9, at the earth's surface is an DC voltage source of 28 or more volts. The DC power source is connected in series with a resistor 150 and to the cable 18. The power is input to the housing circuit via the cable 18. The probe circuit 116 is a square wave oscillator and a full wave driver which delivers a constant square wave voltage to the inductor coil in the probe member. The frequency of the power is selected to be approximately 15 kHZ. It will be appreciated that the frequency is related to eddy currents and hysteresis losses which increase with increasing frequency and magnetizing current which increases with decreasing frequency. Also, the frequency must be high enough to reproduce the signal frequency. Thus, there is a compromise involved in the selection of a frequency.

Power is transferred by the probe inductance coil 90 to the inductance coil 108 in the socket housing for the pressure gauge 23. The square wave excitation is important because small filter capacitors can be used that will not bypass the signal frequencies. In the pressure gauge, the square wave input is converted by a full wave rectifier 152 to a DC voltage to operate the electronics in the pressure gauge.

In the pressure gauge 23 (see FIG. 2), the electronics section includes a switching and signal means or multiplexer 160, a counter means 161, a CPU (processor) means 162, a clock means 163 and input/output means 164. The full wave rectifier 152 receives modulation from the I/O circuit 164 and provides power to a power supply 165 which supplies operating power. The pressure sensors 1 and 2 are alternately connected by the multiplexer to transmit a signal representative of pressure to the counter means 161. A clock input controls the counter and the CPU which develops an output digital signal in the form of low frequency signals as a function of pressure detected by a pressure sensor. A 1 KHZ frequency signal is used to represent a digital "0" and a 2 KHZ frequency signal is used to represent a logic "1" level. The output is alternately switched between these frequencies to transmit a digital signal. Switching is done synchronous with each frequency so that only full cycles are transmitted and no DC component is introduced as a result of the switching. The frequencies are also synchronous. The frequency signals representing a digital representation of the measured pressure are transmitted to the inductance coils by means of modulating the load current to the surface via the cable. At the earth's surface the digital frequency signals are sensed at the resistor 102 by a frequency discriminator and produce a value which is a function of the sensed pressure. Reference may be made to U.S. Pat. No. 4,091,683 for a single channel switching arrangement. The system is designed to utilize minimum power for operation, i.e., low operating voltages and current below 400 milliwatts.

In operation, the side pocket mandrel is first heat treated and then assembled with an inductance probe 45. After the cable is installed, the protective housing 50 is attached prior to entry into the well. The mandrel is located in a string of tubing or pipe and installed in a well bore with a cable 18 extending to the earth surface. A well tool, as shown in FIG. 2, is installed in the side pocket on a wire line in a conventional manner and, when installed, the inductance socket on the well tool has been seated on the inductance probe so that an inductive coupler is defined.

A constant DC power source at the earth's surface provides power to a downhole square wave generator which provides operating power to the well tool via the inductive coupler. In the well tool, the power is converted by a full wave rectifier to provide downhole power. The pressure sensors have their measurements converted to a frequency shifted digital signal for transmission to the earth's surface and a read out as a pressure measurement.

Although the invention has been described with respect to certain specific embodiments, it will a apparent to those skilled in the art that other combinations and modifications of the features and elements disclosed may be made without departing from the scope of the invention.

I claim:

1. An induction coupler for use with coaxial arranged tubular members comprising:

A first tubular member constructed from like non-magnetic material and having a wall defining an cylindrically shaped inner core enclosure;

a core assembly disposed in said core enclosure and including a cylindrically shaped central magnetic ferrite rod, a central member with a thin wall central section forming a bore which is disposed about said ferrite rod and cylindrically shaped end pieces located at the ends of said ferrite rod, said central member having at least one lengthwise extending, thin separation defining lengthwise extending facing surfaces and an electrical insulation separating the adjoining facing surfaces, and a wire coil wrapped about said central section, said central member being constructed from a magnetic material;

said wall of said tubular member having a defined first wall thickness;

a second tubular member constructed from like non-magnetic materials and having inner and outer walls defining an annular shaped outer enclosure with the inner wall having a defined second wall thickness;

said first tubular member being sized relative to said second tubular member in a co-axial arrangement to define an annular spacing with a gap spacing between the outer surface of said wall of said first tubular member and the inner surface of said inner wall where said gap spacing, said first wall thickness and said second wall thickness effectively define the magnetic air gap; and an annular coil assembly in said annular shaped outer enclosure including a wire coil wrapped around the inner wall and two annular end pieces located at the ends of the annular coil assembly, said end pieces having at least one lengthwise extending thin separation defining spacing surfaces, and an electrical insulation separating the adjoining facing surfaces, and a magnetic coupling means extending between said end pieces.

2. The coupler as set forth in claim 1 wherein the second wall thickness and the first wall thickness are relatively large as compared to the width of the gap spacing.

3. The coupler as set forth in claim 2 wherein the ratio of the gap spacing to the combined dimensions of the wall thicknesses and gap spacing is 1 to 9 or greater.

4. The coupler as set forth in claim 2 and further including guide means on said tubular members for assisting location of said first tubular member in said second tubular member.

5. The coupler as set forth in claim 4 wherein said guide means includes a beveled surface on one of said members and a beveled surface on the other of said members.

6. The coupler as set forth in claim 1 wherein said electrical insulation is a relatively thin coating material.

7. The coupler as set forth in claim 1 wherein said magnetic coupling means is magnetic tape wound about the coil.

8. The coupler as set forth in claim 1 wherein the non-magnetic materials are corrosion resistant.

9. The coupler as set forth in claim 1 wherein said central member is formed from complimentary semi-cylindrical elements to define two lengthwise extending thin separations defining lengthwise extending facing surfaces and electrical insulation separates the adjoining facing surfaces of said semi-cylindrical elements.

10. The coupler as set forth in claim 9 wherein said annular end pieces are semi-annular and thin electrical insulation is disposed between adjoining facing surfaces of said annular end pieces.

11. The coupler as set forth in claim 1 where there are more than one lengthwise extending, thin separations in said central member with thin electrical insulation separating adjoining facing surfaces at each separation.

12. The coupler as set forth in claim 11 wherein there are more than one thin lengthwise extending separations in said annular end pieces and electrical insulation is disposed between adjoining facing surfaces at a separation.

13. Apparatus for use in a well bore in a side pocket mandrel where said side pocket mandrel has a longitudinally extending side pocket bore offset from a longitudinally extending main bore of the mandrel for inductively coupling a well tool to an inductive probe, said apparatus comprising:

an elongated probe housing disposed in said side pocket bore, said probe housing being a tubular member constructed from a non-magnetic material and having a housing wall defining a central bore for receiving a core assembly and a connecting end bore for receiving an electronics assembly, said core assembly including a cylindrically shaped central magnetic ferrite rod, a tubular shaped member formed by complementary semi-cylindrical shell members with a thin wall central section forming a bore which is disposed about said ferrite rod, and cylindrically shaped end pieces located at the ends of said ferrite rod, said shell member and having an electrical insulation adjoining facing surfaces, and a wire coil wrapped about said central section, and said shell members being constructed from a magnetic material, a well tool sized for passage through the main bore of the side pocket mandrel and sized for reception in the side pocket bore of the side pocket mandrel, said well tool having an annular end portion with tubular inner and outer members constructed from a non-magnetic material and where said inner member has a socket wall defining a bore sized to receive said probe housing and to define a gap spacing therebetween, said inner member having an outer annular recess, an annular coil wrapped around the inner member and two semi-annular end pieces made of magnetic material and located at the ends of the annular coil assembly, said end pieces having an electrical insulation separating adjoining facing surfaces, and a magnetic coupling means extending between said end pieces, said socket wall, said housing wall and said gap spacing being sized to minimize the gap spacing relative to the thickness of said walls and said socket wall and the housing wall having a thickness minimized to the minimum strength required for the mechanical performance of the tool and the probe housing.

14. The apparatus as set forth in claim 13 and further including a nose piece adapted to fit into the central bore and attached thereto and an end piece adapted to fit into the end bore and attached thereto, said tubular member, said nose piece and said end piece being made from like non-magnetic materials.

15. The apparatus as set forth in claim 13 and further including a transverse ledge in said side pocket bore separating said side pocket bore into an upper tool pocket and a lower cable enclosure, said ledge having a seating surface;

said probe housing having seating surface engaging the seating surface of the ledge, said probe housing further having an high pressure cable connector means disposed in said lower housing and adapted for coupling to a cable.

16. The apparatus as set forth in claim 15 wherein said seating surfaces are beveled for assisting the location of said well tool in said probe housing.

17. The apparatus as set forth in claim 13 wherein said shell members are constructed from soft magnetic iron.

18. The apparatus as set forth in claim 13 wherein said electrical insulation is a relatively thin coating material.

19. The apparatus as set forth in claim 13 wherein said magnetic coupling means is magnetic tape wound about the coil.

20. The apparatus as set forth in claim 13 wherein said non-magnetic materials are corrosion resistant.

21. The apparatus as set forth in claim 15 wherein an electronics assembly is located in said end bore and includes a square wave generator for generating power for said well tool and said well tool has a full wave rectifier for obtaining d.c. power to the well tool, said cable being connected to a surface located source of power.

22. The apparatus as set forth in claim 21 and further including frequency modulating means for encoding and decoding transmission of signals between said well tool and surface located equipment.

23. Apparatus for use in a well bore in a side pocket mandrel where said side pocket mandrel has a longitudinally extending side pocket bore offset from a longitudinally extending main bore of the mandrel for inductively coupling a well tool to an inductive probe, said apparatus comprising:

an elongated probe housing disposed in said side pocket bore, said probe housing being a tubular member constructed from a non-magnetic material and having a housing wall defining a central bore for receiving a core assembly and a connecting end bore for receiving an electronics assembly, said core assembly including a cylindrically shaped central magnetic ferrite rod, a shell member with a thin wall central section forming a bore which is disposed about said ferrite rod, and cylindrically shaped end pieces located at the ends of said ferrite rod, said shell member having at least one lengthwise extending, thin separation defining facing surfaces, an electrical insulation separating the adjoining facing surfaces, and a wire coil wrapped about said central section, and said shell members being constructed from a magnetic material.

a well tool sized for passage through the main bore of the side pocket mandrel and sized for reception in the side pocket bore of the side pocket mandrel, said well tool having an annular end portion with tubular inner and outer members constructed from a non-magnetic material and where said inner member has a socket wall defining a bore sized to receive said probe housing and to define a gap spacing therebetween, said inner member having an outer annular recess, an annular coil wrapped around the inner member and two end pieces made of magnetic material located at the ends of the annular coil assembly, said end pieces having at least one lengthwise extending thin separation defining facing surfaces, an electrical insulation separating the adjoining facing surfaces, and a magnetic coupling means extending between said end pieces, said socket wall, said housing wall and said gap spacing being sized to minimize the gap spacing relative to the thickness of said walls and said socket wall and the housing wall having a thickness minimized to the minimum strength required for the mechanical performance of the tool and the probe housing.

24. The apparatus as set forth in claim 23 wherein said central shell member is formed by complimentary semi-cylindrical elements to define two lengthwise extending thin separations defining lengthwise extending facing surfaces and electrical insulation separates the adjoining facing surfaces of said semi-cylindrical elements.

25. The apparatus as set forth in claim 24 wherein said annular end pieces are semi-annular and thin electrical insulation is disposed between adjoining facing surfaces of said annular end pieces.

26. The apparatus as set forth in claim 23 where there are more than one lengthwise extending thin separations in said central tubular member with thin electrical insulation separating adjoining facing surfaces at each separation.

27. The apparatus as set forth in claim 26 wherein there are more than one thin lengthwise extending separations in said annular end pieces and electrical insulation is disposed between adjoining facing surfaces at a separation.

* * * * *